United States Patent [19]
Flickinger et al.

[11] Patent Number: 5,875,386
[45] Date of Patent: Feb. 23, 1999

[54] ENABLING AND CABLE SIMULATING CIRCUITS FOR WIDEBAND SIGNAL DISTRIBUTION SYSTEM

[75] Inventors: Steven Lee Flickinger, Hummelstown; Joseph Paul Preschutti, State College; James Ray Fetterolf, Sr., Mechanicsburg; Jeffrey Legg; David Koller, both of State College, all of Pa.

[73] Assignee: The Whitaker Corporation, Wilmington, Del.

[21] Appl. No.: 791,307

[22] Filed: Jan. 30, 1997

Related U.S. Application Data

[60] Provisional application No. 60/010,857 Jan. 30, 1996.

[51] Int. Cl.$^6$ .................................................. H04N 7/16
[52] U.S. Cl. ................................. 455/3.1; 455/6.3; 348/8
[58] Field of Search ............................... 455/3.1, 5.1, 6.1, 455/4.2, 6.2, 6.3; 348/6, 8, 10, 11, 12, 13, 7; 379/90.01, 397, 399, 398, 334, 340, 400; H04N 7/10, 7/16, 7/173

[56] References Cited

U.S. PATENT DOCUMENTS

| | | | |
|---|---|---|---|
| 4,717,896 | 1/1988 | Graham | 333/25 |
| 4,766,402 | 8/1988 | Crane | 333/25 |
| 4,885,747 | 12/1989 | Foglia | 348/8 |
| 5,130,793 | 7/1992 | Bordry et al. | 348/8 |
| 5,374,952 | 12/1994 | Flohr | 348/12 |
| 5,485,630 | 1/1996 | Lee et al. | 455/4.1 |
| 5,528,283 | 6/1996 | Burton | 348/13 |
| 5,534,914 | 7/1996 | Flohr et al. | 348/15 |
| 5,592,482 | 1/1997 | Abraham | 348/8 |
| 5,670,902 | 9/1997 | Nakagawa et al. | 348/6 |

FOREIGN PATENT DOCUMENTS

| | | | |
|---|---|---|---|
| 0 496 422A2 | 7/1992 | European Pat. Off. . | |
| 2 626 119 | 7/1989 | France | H03H 11/04 |
| 2 173 077 | 10/1986 | United Kingdom . | |
| 2 178 274 | 2/1987 | United Kingdom | H04H 1/02 |
| 2 263 604 | 7/1993 | United Kingdom | H04H 1/08 |

OTHER PUBLICATIONS

International Search Report, Application # PCT/US96/11191—Apr. 12, 1996.

*Primary Examiner*—Chris Grant
*Attorney, Agent, or Firm*—Salvatore Anastasi

[57] ABSTRACT

An enabling circuit for use in a wideband signal distribution system is provided. The circuit includes a input port which receives a baseband source signal, a transmission path between the input port and the output port, an impedance matching device, and a power source connected to the impedance matching device which combines a biasing signal with the input signal in order to operate a diode switch which is connected to the output to the impedance matching device and located in a distribution unit of the system.

17 Claims, 4 Drawing Sheets

ENABLING AND CABLE SIMULATING CIRCUITS FOR WIDEBAND SIGNAL DISTRIBUTION SYSTEM

This application claims the benefit of U.S. provisional application Ser. No. 60/010,857, filed Jan. 30, 1996.

FIELD OF THE INVENTION

This invention is directed to wideband signal distribution systems, and more particularly to enabling and cable simulator circuits for use in such systems.

BACKGROUND OF THE INVENTION

There are numerous instances where it is desirable to distribute signals within a relatively local area such as a building or series of buildings. A particular application is the distribution of video signals. For example, a school may have a number of classrooms or administrative offices, each having a television monitor, and it may be desired at a given time to provide a program to all the classrooms and offices, originating either from a source within one of the classrooms or offices, such as a VCR, or from an outside source such as a local cable system. A system capable of distributing wideband signals is necessary to provide these programs to the desired locations. Similarly, a corporation may have a building, or several closely spaced buildings, with numerous conference rooms equipped with television monitors and analogous program presentations may be desired.

An example of such a wideband distribution system is disclosed in International Publication Number WO 97/01931, titled "Wideband Signal Distribution System", which is assigned to the assignee hereof and is incorporated herein by reference. That Publication disclosed a wideband distribution system utilizing existing twisted pair cable which is typically installed in buildings for telephone communications. The system, therefore, would require no additional wiring to provide the wideband distribution system to an existing building. This system utilizes distribution units which can be cascaded in order to reach many rooms in the building which are connected to the telephone wiring system. Each distribution unit has a plurality of inputs and outputs, each of which is connected to a different room outlet. In order to reach additional rooms, another distribution unit is simply cascaded into the system. Any of the rooms connected to a distribution unit can be utilized either to transmit a source signal to the entire building or as a receiving location to receive any signal which is transmitted over the distribution system from another location. Since each outlet in this system is capable of both input and output, signals can be distributed to any location from any location. Signals at the input location are generated by a base band signal source and are modulated to a desired frequency channel.

A problem exists, however, when it is desirable to distribute wideband modulated signals to many classrooms or locations. As the number of classrooms increases the number of input and output locations increases, and the amount of near end cross talk also increases. This is due to increased length of cable in the system necessary to support the increased number of classrooms. Near end cross talk occurs as a result of capacitive coupling of signals between the input wires and output wires of each cable. It is therefore an object of this invention to reduce near end cross talk in a broadband distribution system having many input and output ports.

Another problem exists when many outlets are present in the distribution system in that the distance between each distribution unit and outlet is variable. Outlets which are farther from the distribution unit will necessarily contain longer lengths of cable between the distribution unit and the outlet. This results in signal attenuation levels at each outlet being different based on the distance each outlet is from the distribution unit. It is therefore an object of this invention to provide a circuit which simulates long and short lengths of cable in order to provide consistent system signal attenuation levels at each outlet.

SUMMARY OF THE INVENTION

The objects of this invention are achieved by providing a signal enabling circuit in order to reduce near end cross talk and by providing a switchable impedance circuit for simulating various lengths of cable in order to achieve the desired attenuation level at each outlet box.

The enabling circuit for use in a wideband signal distribution system of the present invention comprises an input port which receives a baseband source signal, a transmission path between the input port and the output port, at least one impedance matching device, a power source connected to the impedance matching device which combines a biasing signal with the input signal in order to operate a diode switch which is connected to the output of the impedance matching device at the input of a distribution unit.

BRIEF DESCRIPTION OF THE DRAWINGS

The invention will now be described by way of example with reference to the accompanying figures of which.

DETAILED DESCRIPTION OF THE INVENTION

Figure 1:
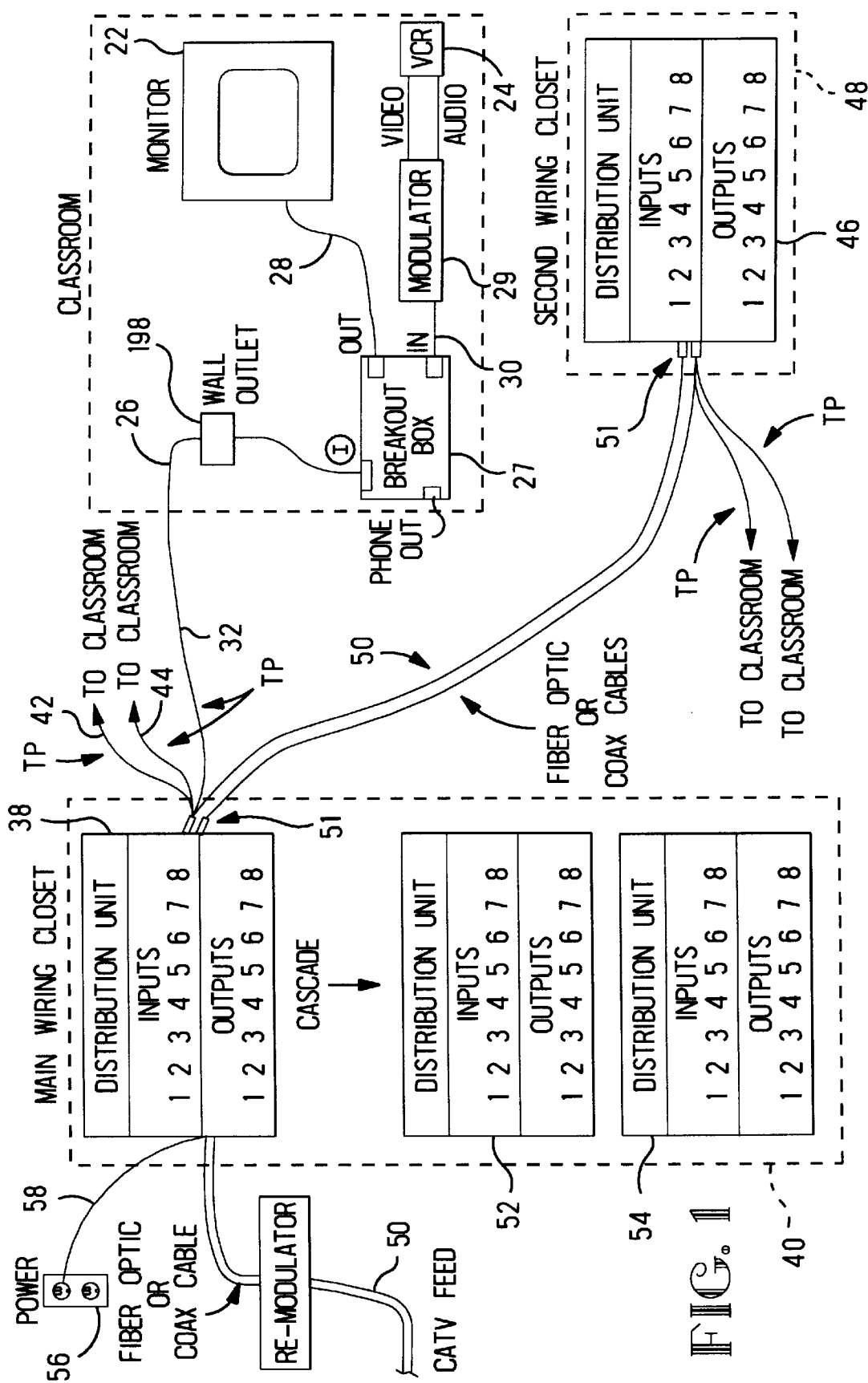
FIG. 1 is a pictorial representation of a wideband signal distribution system constructed in accordance with the principles of this invention.

FIG. 1 shows an example of a wideband signal distribution system and each of its major components. The circuits of the present invention may be utilized in this system, for example, in the breakout box 27, which is located near the source of the baseband signal or input device 24. It is understood, however, that the circuits of the present invention could be located at various locations in the system, for example, in the wall outlet box 26 or in the modulator 29. In this example, the breakout box 27 containing the signal enabling circuit, when plugged into a wall outlet will activate a diode switch 63 (FIG. 3) in the distribution unit 38. Once the diode switch 63 is activated, the distribution unit 38 will be configured to accept a modulated source signal from the input device 24.

The breakout box 27 also contains a switchable impedance circuit (FIG. 2) which can simulate various lengths of cable. Due to the varying distances of each wall outlet from the distribution unit, the length of cable 32 will be different for each outlet 26. This will cause varying levels of signal attenuation at each wall outlet 26 which is directly proportional to the length of the cable 32. In order to compensate for these varying attenuation levels, the breakout box 27 has a wire simulating impedance which can compensate for the varying lengths of cable 32.

Figure 2:
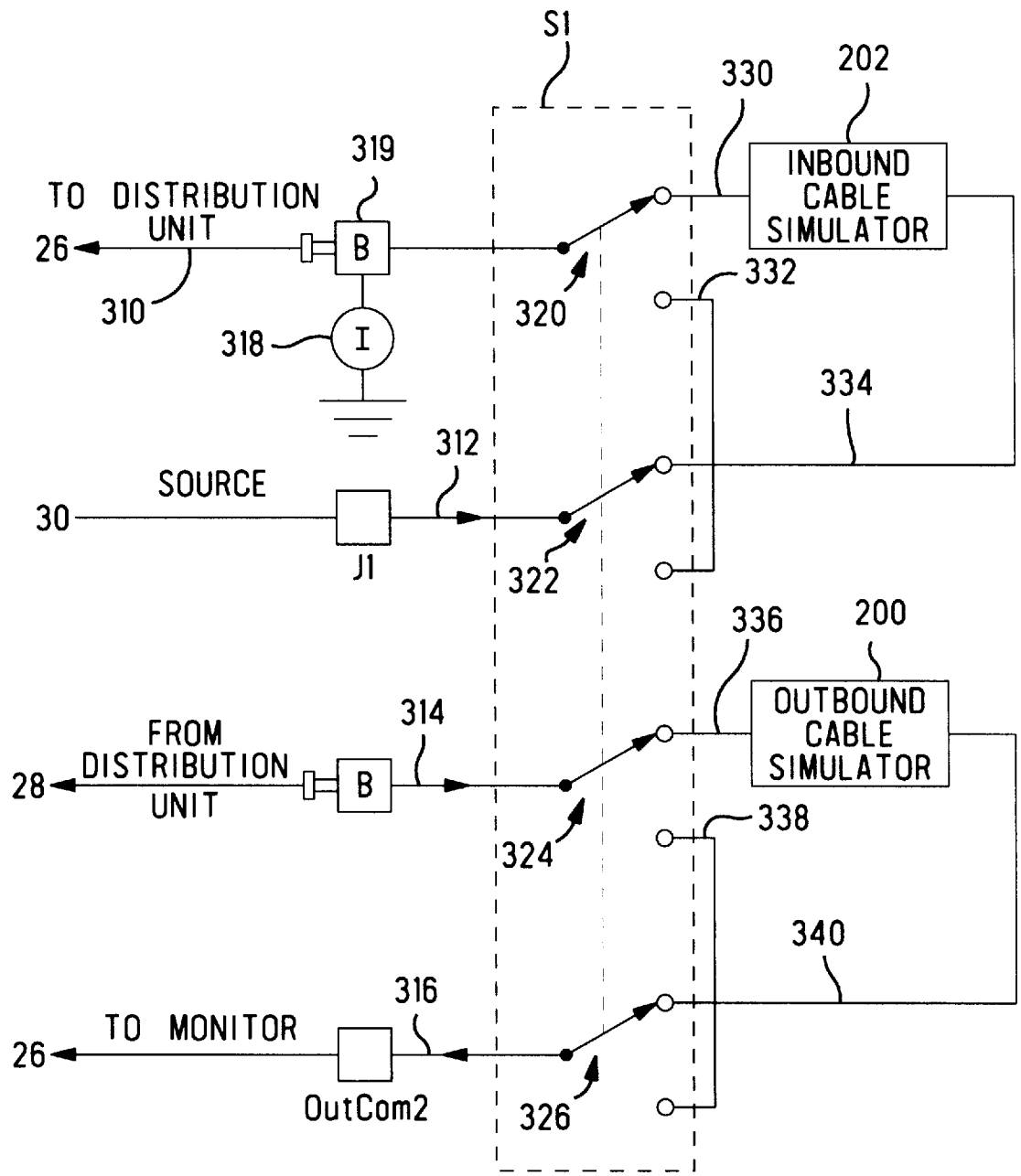
FIG. 2 is a block diagram of an enabling and switchable cable simulator circuit according to the present invention.

FIG. 2 shows a block diagram of an enabling circuit and an example of a cable simulator switchable circuit 131, 137 which operates between a distribution unit 60 as shown in FIG. 1 and a source 24 of video or other baseband signals. This circuit may be housed for example in the breakout box 27 (FIG. 1) or in a wall outlet box 26 or in a modulator 29, or in the input device 24. A source signal, for example a video signal from a VCR input device or from a cable television channel, is connected to input line 312 of the circuit This signal is ultimately supplied to line 310 of the circuit where a positive polarity DC enabling signal is added to the base band video source signal. The enabling signal is supplied by the current supply 318 which is connected to the output balun 319.

This circuit is switchable so that it can simulate various lengths of cable in order to achieve a desired attenuation at the outlets 198 (FIG. 1) of the circuit. When the switch parts 320, 322, 324 and 326 are in the position shown in FIG. 2, the base band input signal on line 312 passes through an input 334 to an inbound cable simulator 202, which consists of an impedance to simulate a desired length of cable, for example 120 feet or ½ of the maximum distance which in this example is 240 ft. The output of the inbound cable simulator 202 is then passed through line 330 and switch part 320 to the output balun 319, where it is combined with the enabling signal from the current source 318. This signal is then supplied as an enabled input signal, which will bias a diode switch 63 in the distribution unit 38 shown in FIG. 3. Similarly, the output from the distribution unit connected to line 314 of the enabling circuit is switched to achieve a desired attenuation by simulating an outbound cable equivalent in length to the inbound cable simulated above. When switch parts 324 and 326 are in the position shown in FIG. 2, the outbound signal from the distribution unit passes to the input 336 of an outbound cable simulator 200 which is an impedance designed to simulate a given length of cable in order to achieve a desired level of attenuation. The output 340 of the outbound cable simulator 200 is then passed through the switch part 326 and to the output port 316 to be ultimately supplied to a monitor or some other display device. As the length of cable 32 is increased and the outlet box 196 is farther from the distribution unit, both the inbound and outbound cable simulators may be switched out of the circuit by actuating the switch parts 320, 322, 324, 326.

Figure 3:
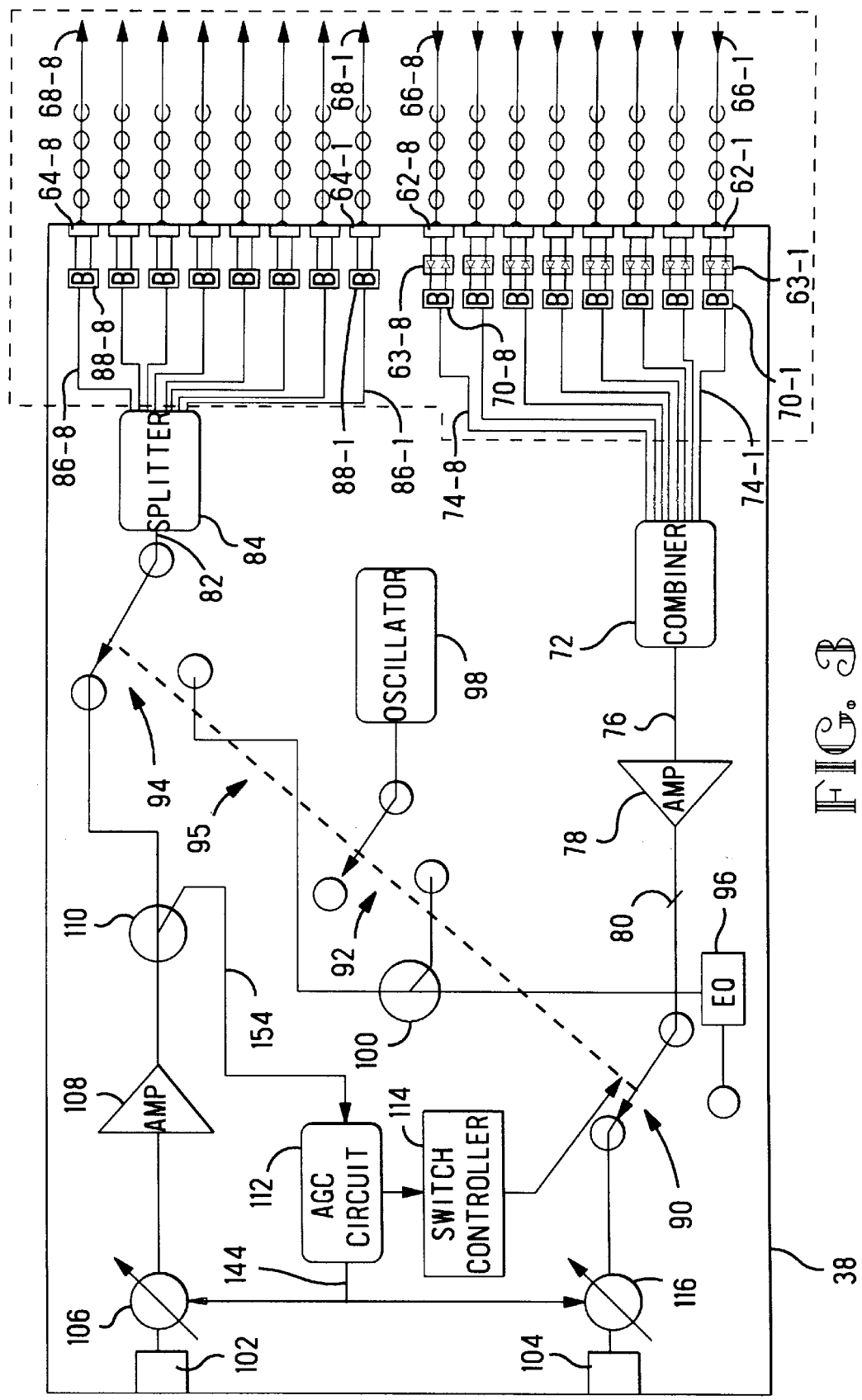
FIG. 3 is a block diagram of a distribution unit for use in the system of FIG. 1.

The DC current source 18 is used to bias a PIN diode switch 63-1 through 63-8 shown in FIGS. 3. The switch 63 will be turned on when an enabled input as described above is applied. The switch 63 will be off when the respective cable 32 is not being used as an input. This PIN diode switch 63 will allow only those inputs to the distribution unit which are currently in use to be active, thus reducing the total number of active inputs, and cables in the system therefore reducing the near end cross talk in the modulated frequency band. Since there are only a limited number of channels, there can only be a total possible number of active inputs equal to or less than the number of channels thus greatly reducing the possibility of near end cross talk due to multiple system inputs having lengths of wire which can cross talk with each other.

Figure 4:
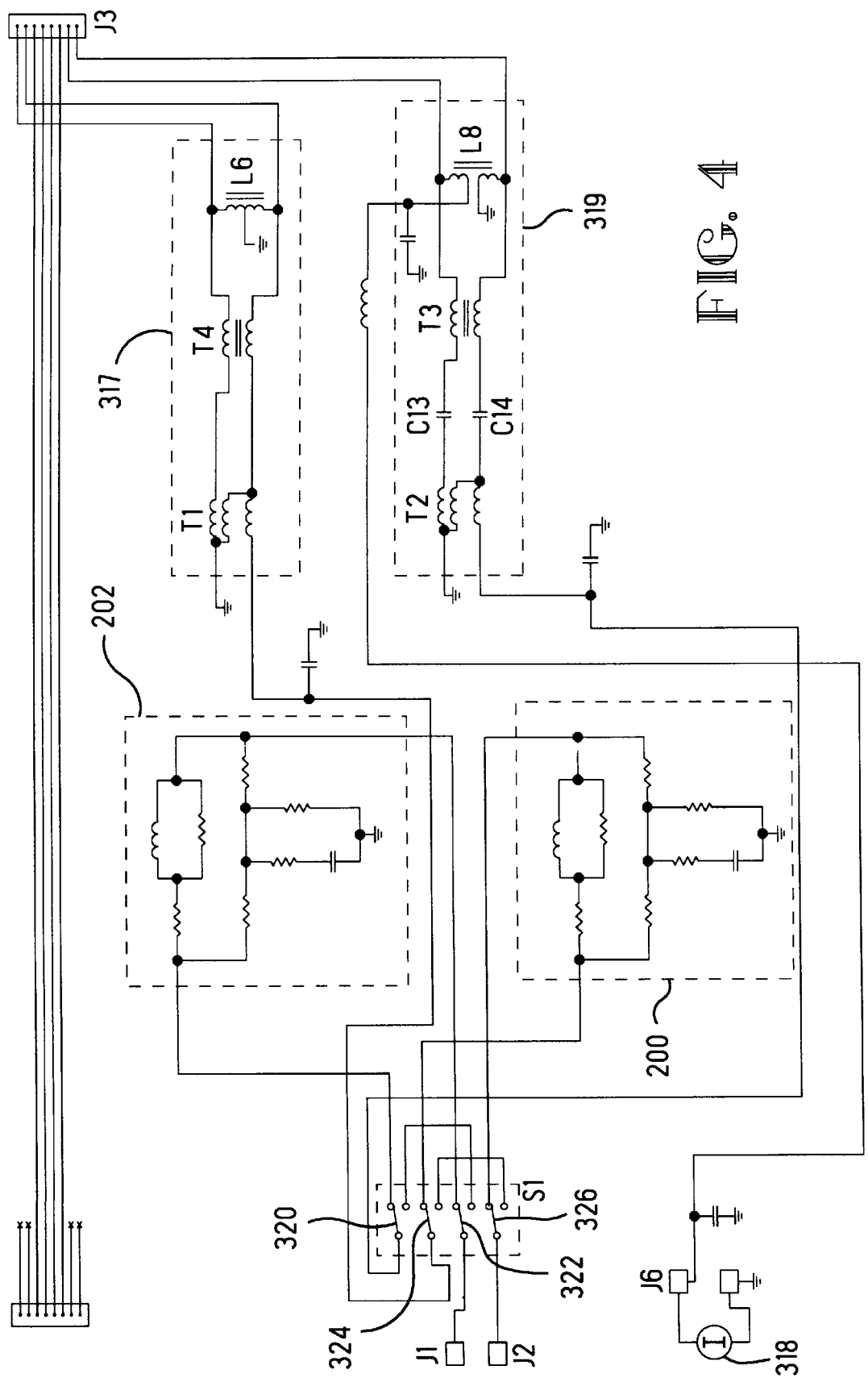
FIG. 4 is a schematic of the cable simulator circuit of FIG. 2.

Operation of the cable simulator and enabling circuits of the present invention will now be described in greater detail. Referring to FIGS. 2 and 4, an example of the enabling circuit and cable simulator circuit of the present invention is shown. When the switch S1 is in the position shown, the cable simulators 200,202 are switched into the circuit. An inbound signal from a source such as a VCR is supplied to the inbound port J1 and then passes through switch parts 322 and is attenuated through the inbound cable simulator 202. The output of the inbound cable simulator 202 is applied to switch part 320 and then passes through a balun 319 consisting of T2, C13, C14, T3, and L8 where it is mixed with a DC enabling signal supplied by the power supply 318 through J6 at L8 to create an enabled signal. This enabled signal then passes to a connector J3 and is the inbound signal to the wideband signal distribution unit. The outbound wideband distribution signal from the distribution unit enters the enabling cable simulator circuit through the same connector J3. The outbound modulated signal then passes through a balun 317 for impedance matching which consists of L6, T4 and T1 and then through switch part 324. From switch part 324, the signal passes through the outbound cable simulator 200 to simulate an equivalent length of cable as the inbound cable simulator 202 described above. This signal is then passed through switch part 320 to the outbound port J2. The outbound signal coming from this port J2 can be displayed on a monitor 22. Actuation of the switch S1 causes both the inbound and outbound cable simulators to be switched out of the circuit allowing both the inbound and outbound signals to pass through this circuit without added attenuation.

An advantage of this circuit is that the number of inputs can be greatly increased since each input is turned off when not in use thus avoiding such inputs from contributing to near end cross talk.

Another advantage of this circuit is that outlets at various lengths from the distribution will receive similarly attenuated signals resulting in a more uniform picture quality and signal level at each receiving location. While an illustrative embodiment of the present invention has been disclosed herein, it is understood that various modifications and adaptations to the disclosed embodiment will be apparent to those of ordinary skill in the art and it is intended that this invention be limited only by the scope of the appended claims.

We claim:

1. An enabling circuit for use in a wide band signal distribution system comprising:

at least one input port to receive a source signal, at least one transmission path between said input port and at least one impedance matching device whereby the source signal is transmitted through said transmission path to said impedance matching device, at least one diode switch connected to an output of said impedance matching device, and;

at least one power source connected to said impedance matching device capable of biasing said diode switch whereby the signal generated by said power source is combined with the source signal at said impedance matching device.

2. The enabling circuit as recited in claim 1 wherein said impedance matching device is a balun.

3. The enabling circuit as recited in claim 1 wherein said power source is a current source.

4. The enabling circuit as recited in claim 1 wherein said input port, said transmission path, said impedance matching device, and said power source are located in a breakout box which is connected to a distribution system output line leading to a distribution unit located remotely from the breakout box.

5. The enabling circuit as recited in claim 4 wherein said diode switch is located in a distribution unit which is remote from and connected to said breakout box.

6. The enabling circuit as recited in claim 1 further comprising a cable simulator having an inbound section and an outbound section, the inbound section having a source line input connected to a switchable impedance and an output connected to said impedance matching device, the outbound section having a distribution system input connected to a switchable impedance and an output connected to a display device.

7. A wideband signal distribution system enabling circuit comprising:

a diode switch located at an input line to a wideband signal distribution system, a transmission path connected to said diode switch at a first end, an impedance matching device connected to the transmission path at a second end, the impedance matching device having a source signal input, a biasing signal input, and an output, and;

a power source connected to the impedance matching device at said biasing signal input whereby a wideband modulated source signal; is combined with a biasing signal generated at said power source to bias said diode switch in order to change said transmission path from an off state to an on state.

8. The enabling circuit as recited in claim 7 wherein said impedance matching device is a balun.

9. The enabling circuit as recited in claim 7 wherein said power source is a current source.

10. The enabling circuit as recited in claim 7 wherein said input port, said transmission path, said impedance matching device, and said power source are located in a breakout box which is connected to a distribution system output line leading to a distribution unit located remotely from the breakout box.

11. The enabling circuit as recited in claim 10 wherein said diode switch is located in a distribution unit which is remote from and connected to said breakout box.

12. The enabling circuit as recited in claim 7 further comprising a cable simulator having an inbound section and an outbound section, the inbound section having a source line input connected to a switchable impedance and an output connected to said impedance matching device, the outbound section having a distribution system input connected to a switchable impedance and an output connected to a display device.

13. An enabling circuit for use in a wide band signal distribution system comprising:

at least one input port to receive a source signal, at least one transmission path between said input port and at least one impedance matching device whereby the source signal is transmitted through said transmission path to said impedance matching device, and;

at least one diode switch connected to the impedance matching device, whereby the diode switch serves to disable the transmission paths in the absence of a power signal being combined with said source signal.

14. The enabling circuit as recited in claim 13 wherein said impedance matching device is a balun.

15. The enabling circuit as recited in claim 13 wherein said power signal is supplied by a current source.

16. The enabling circuit as recited in claim 13 wherein the input port, the transmission path, the impedance matching device, and the current source are located in a breakout box which is connected to a distribution system output line leading to a distribution unit located remotely from the breakout box.

17. The enabling circuit as recited in claim 16 wherein the diode switch is located in a distribution unit which is remote from and connected to the breakout box.

* * * * *